(12) United States Patent
Sartee et al.

(10) Patent No.: US 9,892,602 B2
(45) Date of Patent: *Feb. 13, 2018

(54) INTEGRATED VISUAL NOTIFICATION SYSTEM IN AN ACCESSORY DEVICE

(71) Applicant: Apple Inc., Cupertino, CA (US)

(72) Inventors: Jared Sartee, Saratoga, CA (US); Justin Wodrich, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/275,259

(22) Filed: Sep. 23, 2016

(65) Prior Publication Data

US 2017/0011601 A1 Jan. 12, 2017

Related U.S. Application Data

(63) Continuation of application No. 15/262,504, filed on Sep. 12, 2016, which is a continuation of application (Continued)

(51) Int. Cl.
*G08B 5/22* (2006.01)
*G08B 5/36* (2006.01)
*G06F 1/16* (2006.01)

(52) U.S. Cl.
CPC ............. *G08B 5/36* (2013.01); *G06F 1/1626* (2013.01); *G06F 1/1632* (2013.01); *G06F 2200/1634* (2013.01)

(58) Field of Classification Search
CPC ........ G08B 5/36; G06F 1/1626; G06F 1/1632
(Continued)

(56) References Cited

U.S. PATENT DOCUMENTS 5,595,439 A 1/1997 Maddock et al.
6,260,987 B1 7/2001 Wu
(Continued)

FOREIGN PATENT DOCUMENTS

CN 2407526 Y 11/2000
CN 1312618 A 9/2001
(Continued)

OTHER PUBLICATIONS

PCT Application No. PCT/US2013/065292—International Search Report & Written Opinion dated Feb. 13, 2014.
(Continued)

*Primary Examiner* — Kerri McNally
(74) *Attorney, Agent, or Firm* — Downey Brand LLP

(57) ABSTRACT

The described embodiments relate generally to an accessory device for a tablet device. The accessory device takes the form of a flexible screen protector that can be disposed over a display portion of the tablet device. Because the flexible screen protector covers the display of the tablet there is no visual way for the tablet to provide notifications to the user while the screen protector overlays it. By providing a data and power connection between the tablet and the accessory device, the processor of the tablet device can command illumination elements disposed in the accessory device to be illuminated in any of a number of illumination states. Each of the illumination states can be associated with an operating state of the tablet device thereby allowing the tablet device to visually communicate operating state information while the display is covered.

20 Claims, 9 Drawing Sheets

Related U.S. Application Data

No. 14/694,977, filed on Apr. 23, 2015, now Pat. No. 9,483,921, which is a continuation of application No. 13/708,833, filed on Dec. 7, 2012, now Pat. No. 9,104,371.

(58) Field of Classification Search
USPC .......................................................... 340/6.1
See application file for complete search history.

(56) References Cited

U.S. PATENT DOCUMENTS

| | | |
|---|---|---|
| 6,814,472 B2 | 11/2004 | D'Andrea, Jr. et al. |
| 7,089,040 B2 | 8/2006 | Iwatei et al. |
| 7,250,955 B1 | 7/2007 | Beeman et al. |
| 7,332,877 B2 | 2/2008 | Crodian et al. |
| 7,806,559 B2 | 10/2010 | Reed |
| 7,948,744 B2 | 5/2011 | Bishop et al. |
| 8,013,576 B2 | 9/2011 | Chou |
| 8,032,118 B1 | 10/2011 | Othmer et al. |
| 8,037,421 B2 | 10/2011 | Scott et al. |
| 8,143,982 B1 | 3/2012 | Lauder et al. |
| 8,253,518 B2 | 8/2012 | Lauder et al. |
| 8,264,310 B2 | 9/2012 | Lauder et al. |
| 8,289,115 B2 | 10/2012 | Cretella, Jr. et al. |
| 8,312,991 B2 | 11/2012 | Diebel et al. |
| 8,328,008 B2 | 12/2012 | Diebel et al. |
| 8,335,500 B2 | 12/2012 | Bender et al. |
| 8,344,836 B2 | 1/2013 | Lauder et al. |
| 8,390,411 B2 | 3/2013 | Lauder et al. |
| 8,390,413 B2 | 3/2013 | Lauder et al. |
| 8,576,031 B2 | 11/2013 | Lauder et al. |
| 8,614,968 B1 | 12/2013 | Cody et al. |
| 8,624,695 B2 | 1/2014 | Cretella, Jr. et al. |
| 8,654,074 B1 | 2/2014 | Auguste et al. |
| 8,665,044 B2 | 3/2014 | Lauder et al. |
| 8,764,206 B2 | 7/2014 | Vilardell et al. |
| 8,766,921 B2 | 7/2014 | Ballagas et al. |
| 8,824,136 B1 | 9/2014 | Interian, III et al. |
| 9,104,371 B2 * | 8/2015 | Sartee .................. G06F 1/1632 |
| 9,483,921 B2 * | 11/2016 | Sartee .................. G06F 1/1632 |
| 2003/0012012 A1 | 1/2003 | Hong |
| 2004/0222977 A1 | 11/2004 | Bear et al. |
| 2005/0036286 A1 | 2/2005 | Kuan |
| 2005/0111231 A1 | 5/2005 | Crodian et al. |
| 2005/0127820 A1 | 6/2005 | Yamazaki et al. |
| 2006/0066557 A1 | 3/2006 | Floyd |
| 2006/0132436 A1 | 6/2006 | Wenstrand et al. |
| 2008/0205082 A1 | 8/2008 | Chen et al. |
| 2008/0247152 A1 | 10/2008 | Chen |
| 2008/0302456 A1 | 12/2008 | Cook |
| 2009/0091910 A1 | 4/2009 | Lee |
| 2009/0091912 A1 | 4/2009 | Lee |
| 2009/0221267 A1 | 9/2009 | Bender et al. |
| 2011/0128166 A1 | 6/2011 | Kagami |
| 2011/0138464 A1 | 6/2011 | Ohta et al. |
| 2011/0272088 A1 | 11/2011 | Cincotti |
| 2012/0037523 A1 | 2/2012 | Diebel et al. |
| 2012/0068919 A1 | 3/2012 | Lauder et al. |
| 2012/0069502 A1 | 3/2012 | Lauder et al. |
| 2012/0069503 A1 | 3/2012 | Lauder et al. |
| 2012/0081074 A1 | 4/2012 | Cunanan et al. |
| 2012/0140393 A1 | 6/2012 | Lan et al. |
| 2012/0140396 A1 | 6/2012 | Zeliff et al. |
| 2012/0194448 A1 * | 8/2012 | Rothkopf ............. A45C 13/002 345/173 |
| 2012/0224316 A1 | 9/2012 | Shulenberger |
| 2012/0244848 A1 | 9/2012 | Ghaffari et al. |
| 2012/0268891 A1 | 10/2012 | Cencioni |
| 2012/0300383 A1 | 11/2012 | Lauder et al. |
| 2013/0027781 A1 | 1/2013 | Eckardt et al. |
| 2013/0063873 A1 | 3/2013 | Wodrich et al. |
| 2013/0076614 A1 | 3/2013 | Ive et al. |
| 2013/0078976 A1 | 3/2013 | Naftolin |
| 2013/0080762 A1 | 3/2013 | Cretella, Jr. et al. |
| 2013/0093596 A1 | 4/2013 | Bender et al. |
| 2013/0100055 A1 | 4/2013 | Lauder et al. |
| 2013/0120265 A1 | 5/2013 | Horii et al. |
| 2013/0162554 A1 | 6/2013 | Lauder et al. |
| 2013/0258586 A1 | 10/2013 | Shao et al. |
| 2013/0300679 A1 * | 11/2013 | Oh ........................ A45C 11/00 345/173 |
| 2013/0301235 A1 | 11/2013 | Harooni |
| 2013/0328825 A1 | 12/2013 | Brown et al. |
| 2013/0328914 A1 | 12/2013 | Smith et al. |
| 2013/0328917 A1 | 12/2013 | Zambetti et al. |
| 2014/0043741 A1 | 2/2014 | Smith et al. |
| 2014/0075075 A1 | 3/2014 | Morrill et al. |

FOREIGN PATENT DOCUMENTS

| | | |
|---|---|---|
| CN | 101542413 A | 9/2009 |
| CN | 101572745 A | 11/2009 |
| CN | 102692963 A | 9/2012 |
| CN | 202551538 U | 11/2012 |
| JP | 2006178986 A | 7/2006 |
| JP | 2013080268 A | 5/2013 |
| KR | 200196734 Y1 | 9/2000 |
| KR | 20070072857 A | 7/2007 |
| KR | 20110025939 A | 3/2011 |
| KR | 2020120007825 U | 11/2012 |
| WO | 2002044878 A1 | 6/2002 |

OTHER PUBLICATIONS

Korean Patent Application No. 10-2015-7015031—Notice of Preliminary Rejection dated Mar. 15, 2016.
European Patent Application No. 13860091.1—Search Report dated Jun. 16, 2016.
Chinese Patent Application No. 201380063348.9—First Office Action dated Sep. 27. 2017.

* cited by examiner

INTEGRATED VISUAL NOTIFICATION SYSTEM IN AN ACCESSORY DEVICE

CROSS-REFERENCE TO RELATED APPLICATIONS

This application is a continuation of U.S. application Ser. No. 15/262,504, filed Sep. 12, 2016, entitled "INTEGRATED VISUAL NOTIFICATION SYSTEM IN AN ACCESSORY DEVICE", which is a continuation of U.S. application Ser. No. 14/694,977, filed Apr. 23, 2015, entitled "INTEGRATED VISUAL NOTIFICATION SYSTEM IN AN ACCESSORY DEVICE", which is continuation of U.S. application Ser. No. 13/708,833, filed Dec. 7, 2012, entitled "INTEGRATED VISUAL NOTIFICATION SYSTEM IN AN ACCESSORY DEVICE", issued Aug. 11, 2015 as U.S. Pat. No. 9,104,371, the contents of which are incorporated herein by reference in its entirety for all purposes.

FIELD

The described embodiments relate generally to accessory devices for portable electronic devices. In particular methods for displaying status information of a portable device through an accessory is disclosed.

BACKGROUND

Recent advances in portable computing include the introduction of hand held electronic devices and computing platforms known generically as tablet devices. These devices can be used for any number of tasks including word processing, social media networking, video conferencing, and gaming. These tablet devices also generally include a large screen that can be susceptible to damage. Consequently many users choose to cover the display of tablet devices with some form of screen protector. Because the screen protector tends to mask information displayed on the screen it becomes difficult to present visual alerts or updates to a user on the status of any number of tasks or events without removing the screen protector. A user must generally wait until the protective cover is remove to receive any updates on events that have transpired since the device was last used.

Therefore, what is desired is a way to alert a user of an event or change in status associated with the tablet device while the screen protector is covering the tablet screen.

SUMMARY

This paper describes various embodiments that relate to an apparatus and method for providing a visual indication of an operating state of a tablet device to a user.

In a first embodiment an accessory device is disclosed. The accessory device is configured to be detachably coupled to a host device having a display. The accessory device includes at least the following: (1) a flexible flap having a size and shape in accordance with the display of the host device, the flexible flap having both a first and second surface; (2) a number of illumination elements disposed across the flap in a first pattern; and (3) a connector configured to receive electrical power from an electrical distribution system of the host device and a control signal from a processor of the host device. The received control signal directs selected ones of the illumination elements to coordinate with each other to provide an illumination state.

In another embodiment a method is disclosed. The method provides a visual notification to a user of a tablet device while a display of the tablet device is covered by an accessory device. The method includes at least the following steps: (1) receiving a control signal at the accessory device from a processor disposed within the tablet device through a communication channel between the tablet device and the accessory device, the accessory device having a flexible flap with a size and shape in accordance with the display of the tablet device; and (2) providing the visual notification corresponding to an operating state of the tablet device by directing selected ones of a number of illumination elements disposed across the flexible flap to coordinate with each other to provide an illumination state in accordance with the received control signal.

In yet another embodiment an accessory device is disclosed. The accessory device includes at least the following: (1) a flexible flap having both a first and second surface; (2) a number of illumination elements disposed across the flap in a first pattern; and (3) a connector configured to receive electrical power and a control signal. The received control signal directs selected ones of the illumination elements to coordinate with each other to provide an illumination state.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The embodiments will be readily understood by the following detailed description in conjunction with the accompanying drawings, wherein like reference numerals designate like structural elements, and in which.

DETAILED DESCRIPTION

Figure 1A:
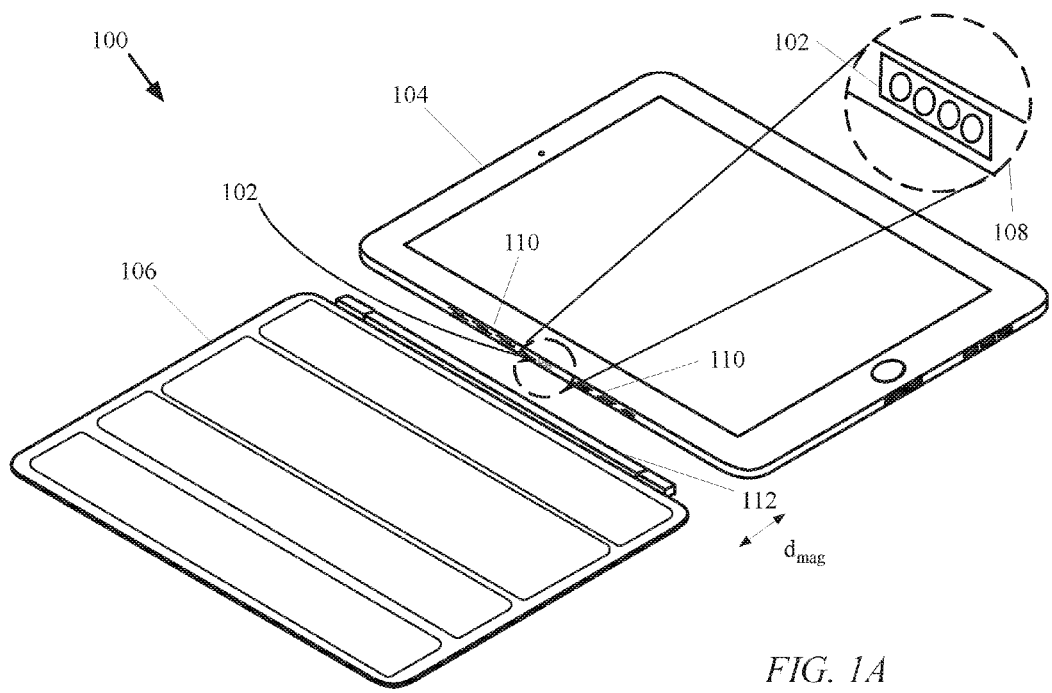
FIG. 1A shows a perspective view of a tablet device with a wired connector implemented between the tablet device and an accessory device.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Accessories for tablet devices have become quite common. Today typical tablet accessories are passive in nature, the majority of which simply function to protect the screen, or perhaps support the tablet in some specific orientation. Although some devices such as Bluetooth headsets and keyboards do have limited interactive capability the majority of accessories are limited to more basic, generally passive tasks. These accessories can be improved by including at least some of the following features: (1) a power source; and (2) a communications protocol. An active communication protocol between an accessory and a tablet device can be accomplished either wirelessly or through a wired data connection. For example, a wireless data connection utilizing the 5 GHz 802.11n protocol can provide sufficient data transmission bandwidth to transmit a high quality video stream along the lines of NTSC 1080p 30 fps video. The accessory can alternatively or additionally be electrically connected to the tablet device using any number of established standards such as DisplayPort™, mini DisplayPort™, DVI, and Thunderbolt™. A custom wireless or wired protocol is also certainly possible.

In one specific embodiment an accessory device taking the form of a flexible flap can be configured with a number of illumination elements. The flexible flap is operable to inform a user of a tablet device of changes in operating states when the display of the tablet device is covered. The flexible flap itself can cover the display acting as a protective layer when the tablet device is not in active use by a user. The illumination elements can be any low power lighting elements thin enough to fit within the flexible flap, such as for example light emitting diodes or electroluminescent panels. A processor located within the tablet device can be configured to control the illumination elements. The processor of the tablet device can be in communication with the flexible flap by way of a connector element that electrically couples the two devices. That same connector element can be used to transfer power from the tablet device to the flexible flap. The tablet device only needs to provide power to the flexible flap when the processor through a control signal commands illumination of at least one of the illumination elements. The illumination of select ones of the illumination elements constitutes an illumination state of the cover alerting the user to any of a number of pre-defined operating states of the tablet device. In some cases the illumination states can be human readable. For example, the illumination elements can form recognizable words or symbols. In other cases a series of lights can be understood by a user to signify a specific operating state.

In another embodiment an accessory device taking the form of a flexible flap can be configured with translucent portions allowing light provided by a display of a host device to shine through the flexible flap. In one specific embodiment the host device can be a tablet device having the display take up a substantial portion of one surface of the tablet device. Since the display of the tablet device performs all of the illuminating in this particular embodiment a data and power connection/link need not be configured between the accessory device and the host device. Translucent portions of the flexible flap can take on different shapes and be disposed in different portions of the flexible flap, such that illumination of each different portion can signify a different meaning. Discrete portions of the display can be illuminated with different shapes and colors corresponding to the translucent portions of the flexible flap. In some cases the discrete displayed portions can include words. Since the display of the tablet device can generally produce any of a wide number of colors and symbols a single transparent portion of the accessory device allows a user to view detailed information from the display of the tablet device representing any of a number of different operating states. Each different color and/or shape/symbol can correspond to different operating states of the tablet device. It should be noted that the opacity of the translucent portions can vary widely in accordance with the lighting effect desired by a designer of the accessory device.

Various embodiments of an accessory device suitable for use with a host device are discussed below with reference to FIGS. 1A-7. However, those skilled in the art will readily appreciate that the detailed description given herein with respect to these figures is for explanatory purposes as the full extent of the embodiments goes beyond these limited descriptions.

In one embodiment a customized connector that passes both data and power can allow for a simple connection between two devices. For example a connector similar to the MagSafe® connector can be integrated with an auxiliary connector which passes data to an accessory device. FIG. 1A shows arrangement 100 in accordance with an embodiment showing connector 102 that can be used to connect tablet device 104 and accessory device 106. Connector 102 can be configured as shown in close up view 108 with a number of separate channels, allowing the power and data transfer lines to traverse separate channels. It should be noted that many different types of connectors can be used to put the two devices in communication and the depicted connector should not be construed as limiting. A physical connector 102 would eliminate the need for a wireless data transmitter in the cover and would simplify electrical and data connections between the two devices. A wired data connection also removes security concerns associated with wireless communication protocols. However, it should be noted that in some embodiments there is no connector 102. In other embodiments a connection can be established by way of a power and/or data cable in lieu of the magnetic coupling depicted. Data transfer between accessory device 106 and tablet device 104 can also be accomplished by a wireless communication protocol. In some embodiments described later in this application no data or power connection needs to be made at all. Now that the electrical and data connection solutions have been discussed the following representative embodiments will include power and data connections between the accessory device and tablet as required.

Figure 1B:
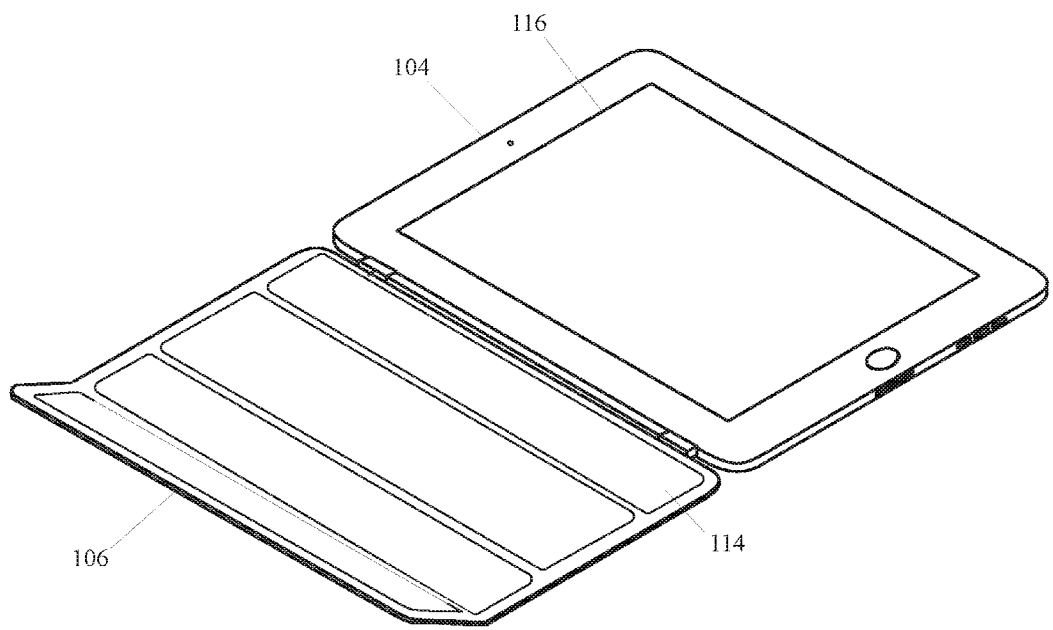
FIG. 1B shows perspective views of a tablet device with a flexible attached accessory device.

Magnetic attraction areas 110 can be used to magnetically attach accessory device 106 and tablet device 104. In a specific embodiment, magnetic attachment areas 110 can magnetically attach to magnetic elements (not shown) within hinge 112. Hinge 112 can be pivotally connected to accessory 106. In this way, accessory 106 can be configured in either an open or closed configuration with respect to tablet device 104. The magnetic attraction between magnetic attachment areas 110 and the magnetic elements in hinge 112 can be such that electronic device 104 and accessory device 106 attach to each other in a preferred alignment. For example, the preferred alignment can assure that connector 102 aligns and mates with a corresponding receptor (not shown) on hinge 112. In this way, the user of tablet device 104 can simply place accessory 106 and tablet device 104 within proximity distance $d_{mag}$ to each other such that the magnetic attraction between magnetic attachment area 110 and the magnetic elements in hinge 112 cause tablet device 104 and accessory device 106 to attach to each other with a high degree of confidence such that a proper mechanical and electrical connection can be made. In addition to transmitting power and information from the tablet device to the accessory device, in some embodiments the accessory device can be configured to transfer data from the accessory device to the tablet device. In some embodiments information transmitted to the tablet device can include information about what features that particular accessory device includes, allowing the tablet to know what types of commands can be received and how those commands will be interpreted. This information can for example allow applications to provide additional functionality corresponding to the features available in the attached accessory device. In other embodiments data transmission can be only from the tablet device to the accessory device in which case a user can enter accessory identification information through a graphical user interface provided by the tablet device. In this way the tablet device can be configured to have uni-directional communication with the accessory device, providing a control signal to the accessory device that in some embodiments dictates which features of the accessory device should be actuated at a given time. FIG. 1B shows a perspective view of tablet device 104 with an attached accessory device 106. In the described embodiment, accessory device 106 can be used to both protect as well as provide functional support features for tablet device 104. Accessory device 106 can bend and flex as depicted allowing it to assume a convenient shape for a user of tablet device 104 to which it is attached.

Figure 2A:
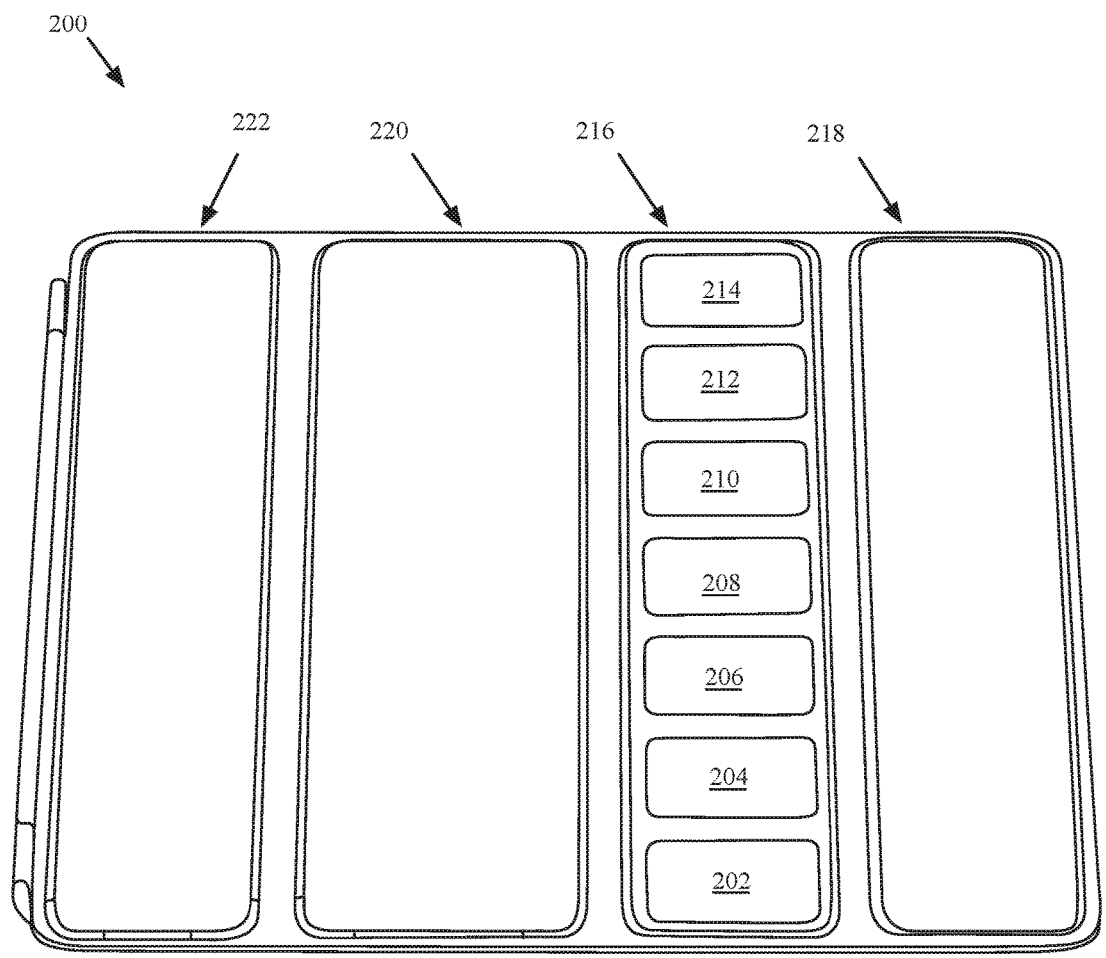
FIG. 2A shows a top perspective view of a tablet accessory device having a number of electroluminescent panels arranged across it.

FIG. 2A shows a top perspective view of tablet accessory device 200 having a number of electroluminescent (EL) panels arranged across it. In some embodiments the EL panels can be built from for example active matrix electroluminescence (AMEL) technology allowing for low power usage, and relatively lightweight. Alternatively, thin film electroluminescent (TFEL) display panels can also be used. A tablet device can be configured to supply both power and control signals to the accessory device as described in conjunction with FIG. 1 for controlling and powering the EL panels of the accessory device. In one embodiment the tablet device can direct the tablet to illuminate EL panel 202 of accessory device 200. In some embodiments EL panel 202 can be configured to display any of a number of different colors. The control signal passed from the tablet device to the accessory device directing illumination of EL panel 202 can also include a call for a particular color that the EL panel should assume. In some embodiments illumination of a particular number or configuration of EL panels can be used to alert a user of the tablet device of the status of a certain event or application. For example, EL panels 202-214 can be configured to each light up red when the processor of the tablet device detects an event with a high enough priority. In some embodiments EL panels 202-214 can be disposed on the surface of accessory device 200 while in other embodiments EL panels 202-214 can be disposed within accessory device 200. In such a case accessory device 200 can have a translucent portion overlaying the EL panels or in other embodiments the EL panels can shine through a thin layer of fabric or plastic, giving the accessory device more of a soft glowing look. In some embodiments a brief animation can be configured across EL panels 202-214. For example, EL panel 202 can be illuminated first followed by EL panel 206 then followed sequentially by EL panels 210 and 214. In some cases the EL panels can be configured to turn on and off. While a few specific examples have been given, many other combinations and permutations of lighting of the illustrated EL panels are certainly possible and within the scope of the described embodiments.

EL panels 202-214 are depicted as being arranged across a segment 216 of accessory device 200, with each EL panel sharing a common rectangular shape. However, it should be noted that EL panels 202-214 can be spread across any of segments 216-222 and take on any number of varying shapes and sizes. For example, in some embodiments additional undepicted EL panels can be associated with accessory device 200 which can take the shape of letters that more specifically alert a user to what kind of alert or change in status has occurred or is occurring. In other embodiments the location of an illuminated EL panel can correspond to the type of application generating the alert. For example, an illuminated EL panel arranged on segment 218 can signify receipt of an email or text message, while an illuminated EL panel arranged on segment 220 can represent status changes in a turn-based video game application. In other embodiments the location of illuminated EL panels can correspond to priority of the status change or alert. For example, an illuminated EL panel disposed on segment 222 can have much lower priority than an illuminated panel disposed on segment 218. It should be noted that in some embodiments an associated tablet device can be configured with a sensor, for example a Hall Effect sensor to determine when accessory device 200 is covering the display of the tablet device. In some cases the tablet device can send the accessory device a signal by way of a control signal to disable all accessory device lighting when the tablet device no longer detects the presence of the accessory device across the display of the tablet device. For example, the accessory device can have a magnet embedded within it that can be sensed by the Hall Effect sensor of the tablet device only when the accessory device covers the tablet device. In this way the lighting can be disabled after uncovering the display of the tablet. It should also be noted that in some cases as will be discussed below, lighting can still be desirable while actively operating the tablet device.

Figure 2B:
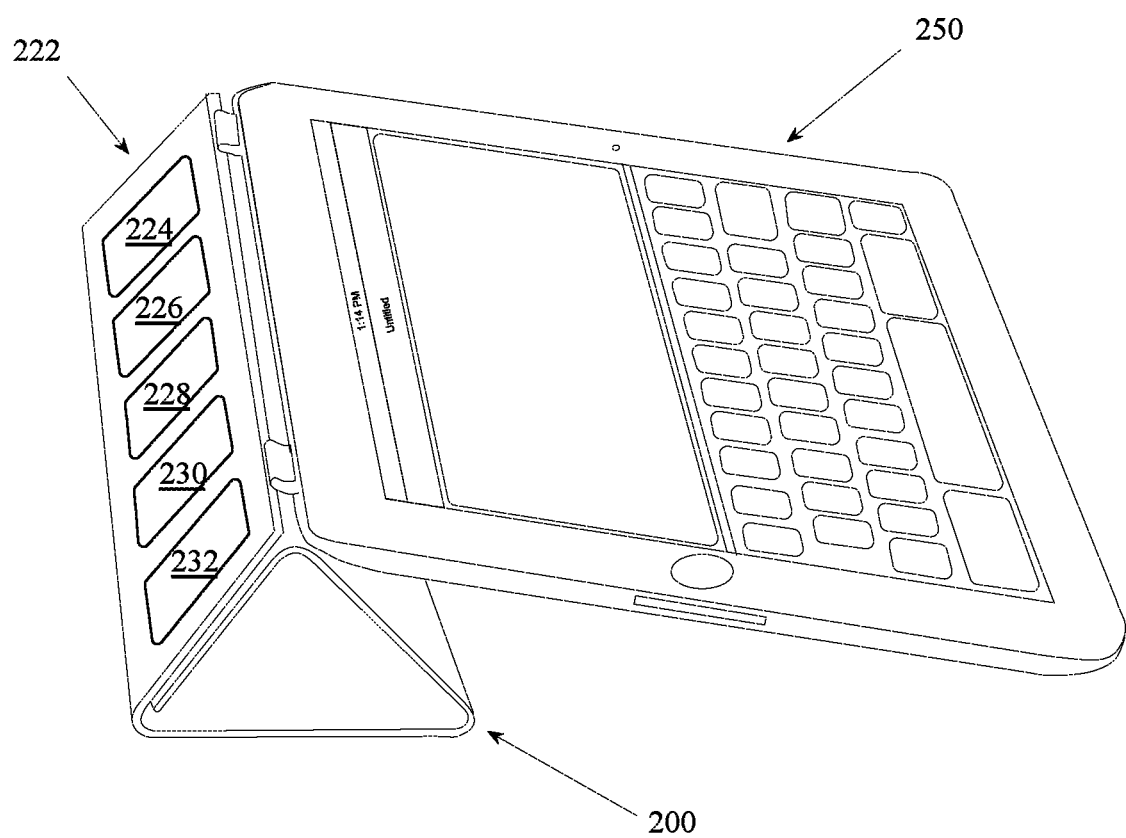
FIG. 2B shows a perspective view of a tablet in an operational state having an accessory device with illumination elements augmenting a particular application.

FIG. 2B shows accessory device 200 configured to support tablet device 250 in a comfortable typing or viewing position. In this embodiment segment 222 has EL panels 224-232 arranged across it. In the depicted embodiment EL panels 224-232 can be visible from both an inner surface of accessory device 200 and an outer surface of accessory device 200. This can be accomplished by embedding EL panels 224-232 within accessory device 200, thereby allowing light to shine out from both the inner and outer surfaces. Opacity of the overlaying accessory device material can be varied in accordance with what type of look is desired. In some embodiments overlying material of the accessory device can be completely transparent while in other embodiments the overlying material can be substantially opaque allowing only a faint glow to shine through either of the surfaces of accessory device 200. When EL panels 224-232 are visible as depicted in FIG. 2B EL panels 224-232 can be used in conjunction with an application configured to utilize the panels. In one embodiment EL panels 224-232 can be configured as a countdown timer. All of EL panels 224-232 can be configured to be illuminated at the start of the timer and then sequentially turned off as the countdown timer approaches zero. Any number of possible illumination element combinations is possible and can be implemented by either first or even third party application developers to augment performance or an overall experience associated with the application running on the tablet device.

Figure 3A:
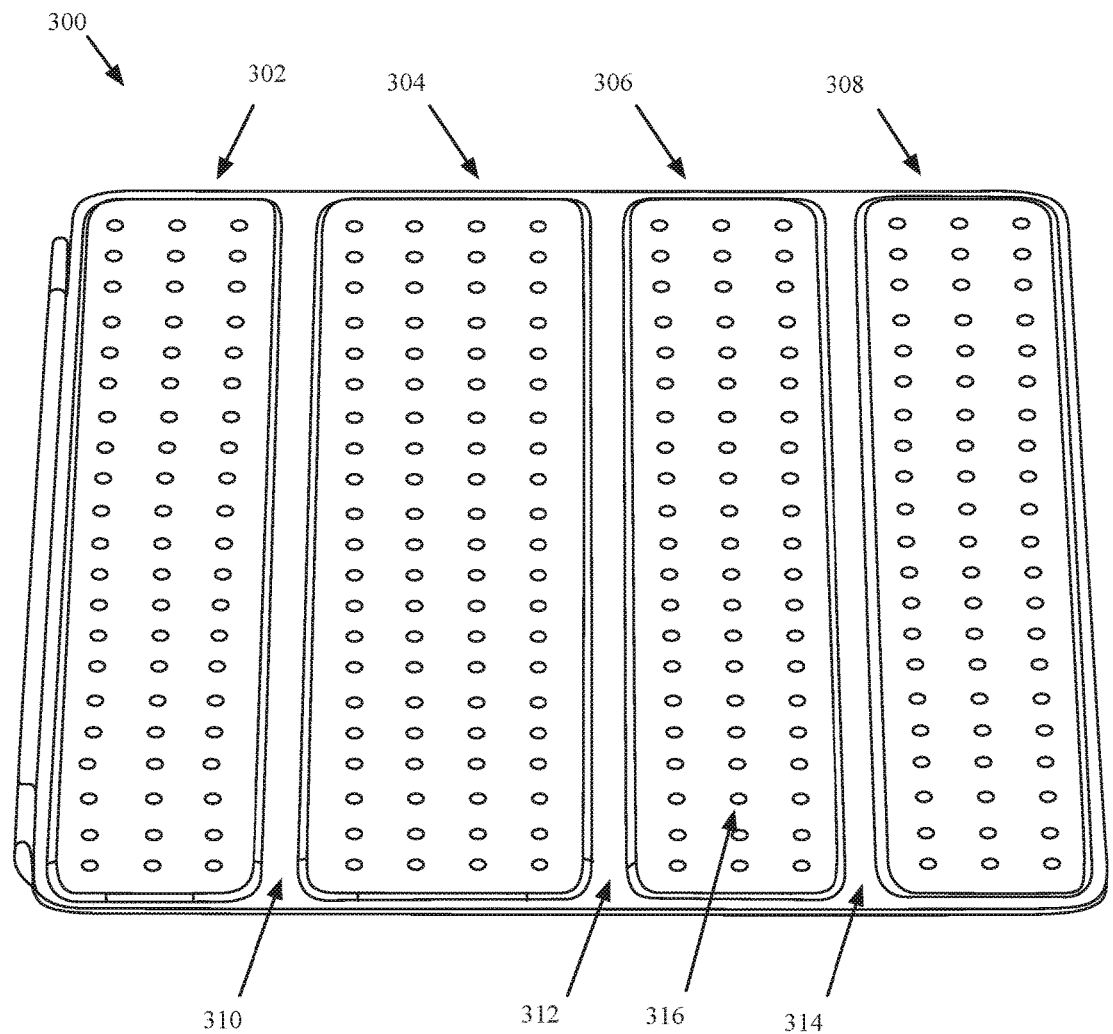
FIG. 3A shows a top perspective view of a tablet accessory device having an array of light emitting diodes arranged across it.

FIG. 3A shows a top perspective view of tablet accessory device 300 having a number of light emitting diodes (LED) arranged across it. Tablet accessory device 300 can have a number of segments 302-308. Segments 302-308 can be rigid and can bend and flex with respect to one another across flexible portions 310-314 of accessory device 300. Each of segments 302 can have a number of LEDs 316 arranged across it. As depicted the LEDs are arranged in a regular array configuration, but it should be noted that any geometric configuration of the LEDs is possible. Each LED 316 can be either a single color LED or can be configured as an RGB LED, the RGB LEDs allowing almost any color to be displayed by each of the LEDs. By illuminating select LEDs 316 messages can be displayed across an outer surface of accessory device 300, the messages in some embodiments telling a user the exact nature of the alert or status update. As a density of LEDs 316 increases so does the ability of accessory device 300 to provide higher resolution information to a user of the tablet device while the tablet device display is covered. An exterior button disposed on either a surface of the tablet device or on the accessory device itself can be used to acknowledge or clear messages displayed by the accessory device, thereby minimizing power usage of the accessory device. For example, the iPad® designed by Apple Inc. of Cupertino, Calif. has a volume button that can in one embodiment be configured to clear the notification or in some embodiments to scroll through a number of different notifications displayable across tablet accessory device 300. In one specific embodiment actuation of the up portion of the volume button can dismiss a notification while actuation of the down portion of the volume button can allow a user to scroll through previously posted notifications representing specific operating states of the tablet device. As discussed previously with regards to the EL panels, LEDs 316 can be disposed either on a surface portion of accessory device 300 or laminated within segments 302-308, thereby providing additional protection for the embedded LEDs 316 and in some embodiments partially obscuring LEDs 316. In some embodiments LEDs 316 can be substantially invisible until being placed into an illuminated state at which point light emanating from LEDs 316 can shine through one or both surfaces of accessory device 300. In addition to displaying messages LEDs 316 can be illuminated in a manner that forms human readable symbols, such as for example an envelope image signifying receipt of an email, or even a thundercloud signifying approach of an imminent storm.

Figure 3B:
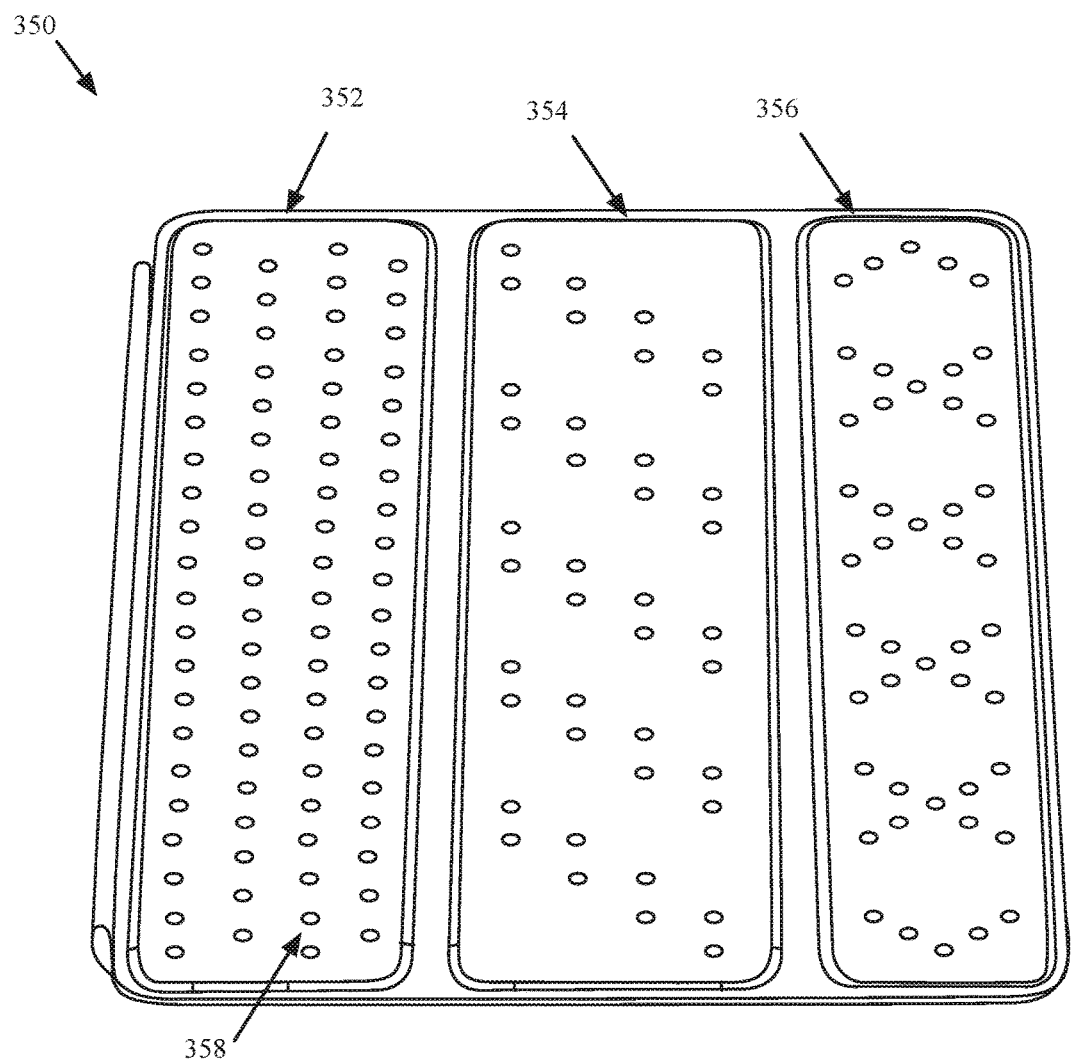
FIG. 3B shows an alternate embodiment of the tablet accessory device depicted in FIG. 3A.

FIG. 3B shows a top perspective view of tablet accessory device 350. Tablet accessory device 350 has three segments, segments 352-356. Segment 352 has an alternative arrangement of light emitting diodes (LEDs) 358. LEDs 358 disposed on segment 352 are offset from one another providing an alternative arrangement capable of presenting different patterns than would be otherwise possible with a grid pattern of the same LED 358 density. Segment 354 has a much lower density of LEDs 358 than segment 352, allowing presentation of illumination states including diagonal stripes. Segment 356 includes yet another layout of LEDs 358 where the LEDs are arranged in cross patterns. Such a configuration allows the display or a cross or rectangle corners or even a series of diagonal stripes that can be configured to complement diagonal stripes displayed on segment 354 in some illumination states. It should be noted that while accessory devices having 3 and 4 segments have been illustrated, other numbers of segments are certainly possible, allowing in one embodiment a user a more flexible cover with greater segments or in another embodiment a less flexible cover with fewer segments. Either can be desirable depending on a contemplated use of the accessory device.

Figure 4:
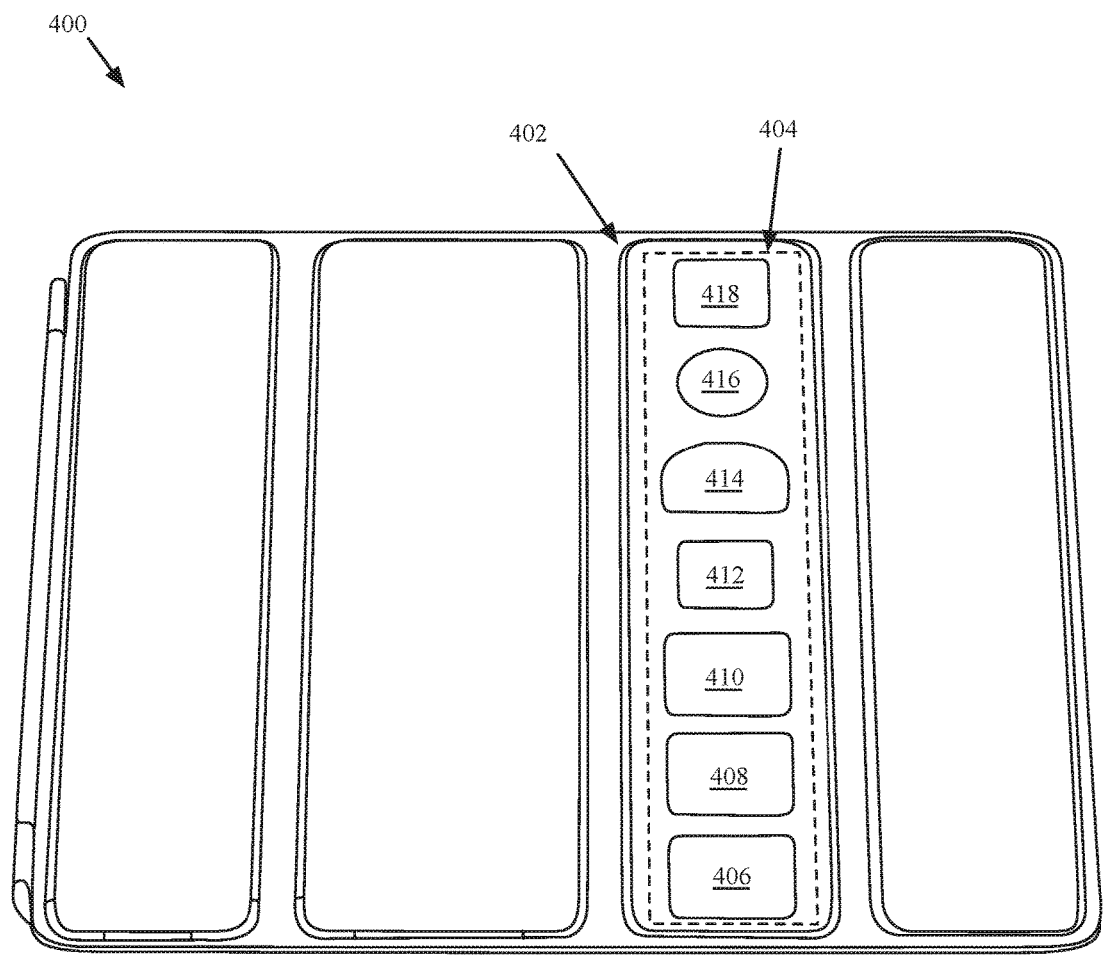
FIG. 4 shows a top perspective view of a tablet accessory device having translucent portions.

FIG. 4 shows a top perspective view of tablet accessory device 400 having a segment 402 with at least one region of transparency 404. Region 404 of accessory device 400 can be at least partially transparent, allowing an underlying display associated with the tablet device to shine messages or alerts through accessory device 400. In this way accessory device 400 itself can be completely passive removing any need for accessory device 400 to be provided with power or electrical commands. Transparency region 404 can be configured to have widely varying opacity. In the depicted embodiment when the underlying display of the tablet device lights up region 406 of transparency region 404, the emitted light can pass through region 406 of transparency region 404. It will be appreciate than one or more of regions 408, 410, 412, 414, 416, and 418 may be illuminated via region the tablet device in a manner similar to that of region 406. When that overlying portion only allows light to penetrate the accessory device in a specific locations the emitted light can be in the form of an illuminated picture or words. Coloring of the emitted light can be influenced by materials embedded within the accessory device and/or an original hue of the light emitted from the tablet's display. In other embodiments where transparency region 404 is completely or least substantially transparent, region 406 of the display of the tablet device can simply show text or images clearly explaining the nature of the notification. It should be noted that in configurations where accessory device 400 is not in communication with an associated tablet device, the tablet device can be configured to receive a user input detailing features of the accessory device. In one embodiment this can be as simple as entering a serial number associated with the accessory device into the tablet device thereby alerting the tablet device to any and all features associated with a specific model of accessory device. For example, a line of accessory devices with a wide variety of translucent region locations can be developed. By entering the serial number the tablet device can be aware of the location, shape, opacity, and orientation of all transparent regions arranged on the accessory device. It should be noted that the embodiments of FIG. 4 can be combined with the embodiments of FIGS. 2 and/or 3 to provide a cover providing both translucent regions with lighting provided by the cover and active illumination elements made up of LEDs and/or EL panels as will be discussed in relation to FIG. 5.

Figure 5:
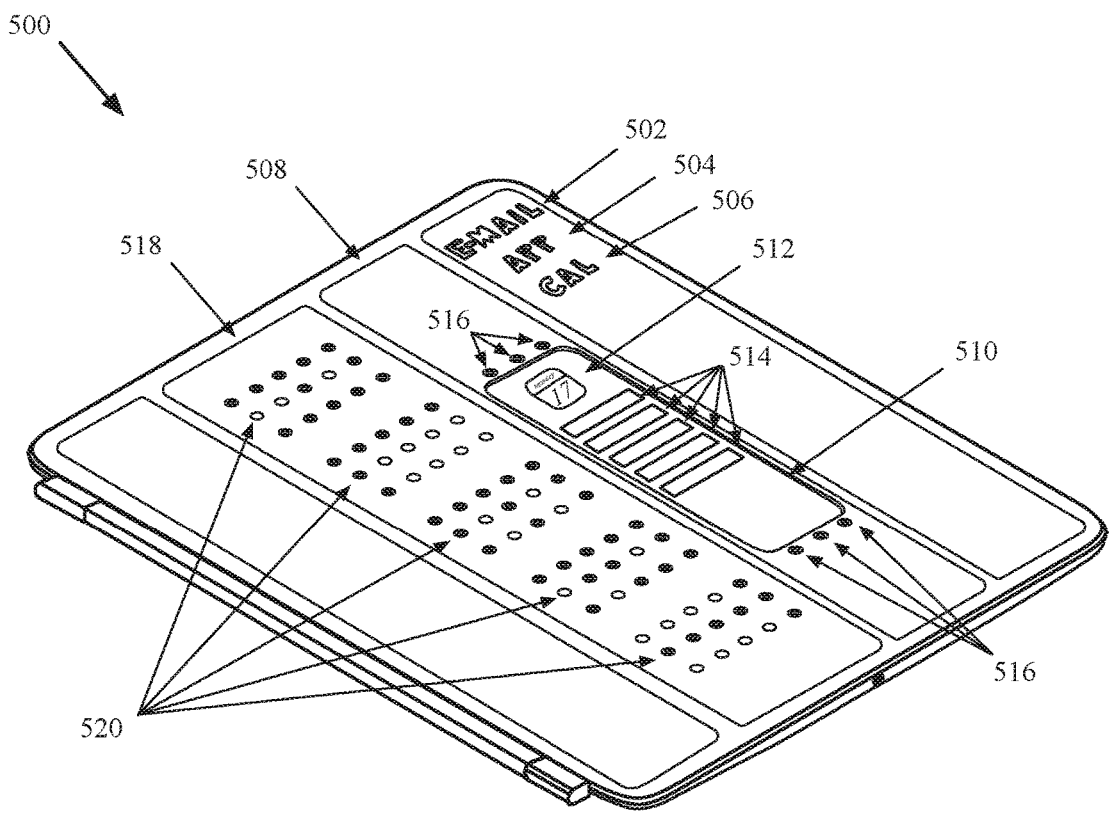
FIG. 5 shows a perspective view of an accessory device having a combination of different types of lighting elements.

FIG. 5 shows accessory device 500 having a combination of different types of lighting elements. In this particular embodiment instead of EL panel blocks as were depicted in FIGS. 2A and 2B specific phrases can be spelled out. For example lighting element 502 can be illuminated when an email is received. Lighting element 504 can be illuminated when an application related event has been detected and lighting element 506 can be illuminated when a calendar notification is received. The letters can be formed by shaping the EL panels to conform with a geometric pattern forming the letters or in some embodiments a masking pattern can be placed over larger EL panels to form corresponding letters.

While only 3 words formed from EL panels are depicted it should be noted that any number of words can be disposed on the accessory device to provide a wide variety of detailed information to a user. Also depicted is segment 508 with a transparent window 510. Transparent window 510 can take on many different embodiments. For example, transparent window 510 can have the same thickness as the rest of accessory segment 508 allowing a user to clearly see through that specific portion of the accessory device while still providing a consistent surface of accessory device 500. In this depiction calendar icon 512 is displayed along an upper portion of transparent window 510 signifying that the displayed information relates to the calendar application. In other embodiments different icons such as an email icon or phone icon can be displayed signifying that the displayed information relates directly to an application associated with that particular icon. Display items 514 can include information about specific alerts. For example, each of display items 514 can include information about a calendar event. In still other embodiments a number of different icons 512 can be displayed concurrently with a numeric indicator associated with each displayed icon informing a user of a number of events or notifications that are pending for each displayed icon. In other embodiments the nature of transparent window 510 can be different. In one particular embodiment transparent window 510 can be a thin protective sheet. In this embodiment a user can interact with touch sensors disposed on an underlying tablet display screen, thereby allowing a certain number of inputs to be received by the tablet through the accessory device.

Also pictured proximate transparent window 510 are illumination elements 516. In one embodiment illumination elements 516 can be RGB LEDs allowing multiple colors to be displayed by each of illumination elements 516. In the depicted embodiment illumination elements 516 can be useful for drawing a user's attention to transparent window 510 when information is being displayed through it. In this way a user is more likely to be alerted to the displayed notification. The color of illuminated illumination elements 516 can also be indicative of an urgency of the displayed message. In this way a user can ignore notifications of lower priority when that user is busy working on a higher priority task. Segment 518 has yet another means of visually informing a user of an event or change in operating state of an associated tablet device. In the depicted embodiment a number of illumination element groups 520 are disposed on segment 518. Each of illumination element groups 520 are configured to display a character. In the depicted embodiment the word "ALERT" is spelled out. It should be noted that additional illumination element groups 520 can be added to provide room for additional characters. Furthermore, a character animation can be displayed where a message is displayed by a scrolling animation revealing one character or in some embodiments one word at a time. In this way a large volume of information can be communicated to a user without the need to remove accessory device 500 from the associated tablet device.

Figure 6:
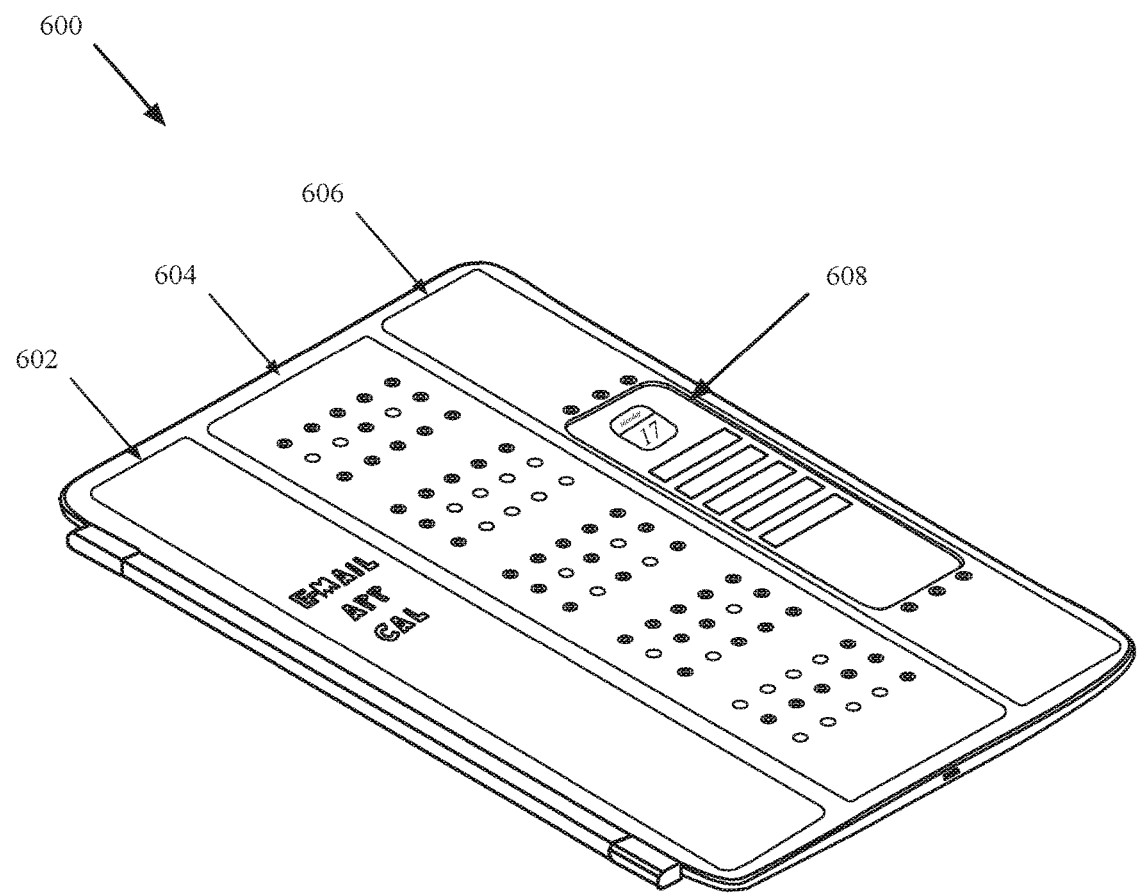
FIG. 6 shows a perspective view of a narrower accessory device including only three segments.

FIG. 6 shows a narrower accessory device 600 including three segments 602-606. Similarly to FIG. 5 this embodiment includes EL panels, a transparent window, and LEDs for providing visual lighting cues to a user of the accessory device. Although this has only three panels as opposed to the four shown in FIG. 5 it should evident that a number of illumination means are still possible. A narrow accessory device as shown can be configured to match an electronic device with a narrower display screen. In this depiction accessory device 600 has transparent window 608 within segment 606. Such an embodiment is possible when an underlying display of an electronic device extends substantially towards an edge portion of the electronic device thereby allowing transparent window 608 to have a portion of display screen visible under all portions of it. It should be noted that in some embodiments transparent window can instead by partially opaque, only allowing a limited amount of light to penetrate the window. In this type of embodiment the display of the electronic device can be used to light up shapes or patterns instead of providing detailed information as the partially opaque nature of the display might not allow a user to easily read underlying text. Other lighting elements displayed in FIG. 6 operate much the same as described in conjunction with FIG. 5.

Figure 7:
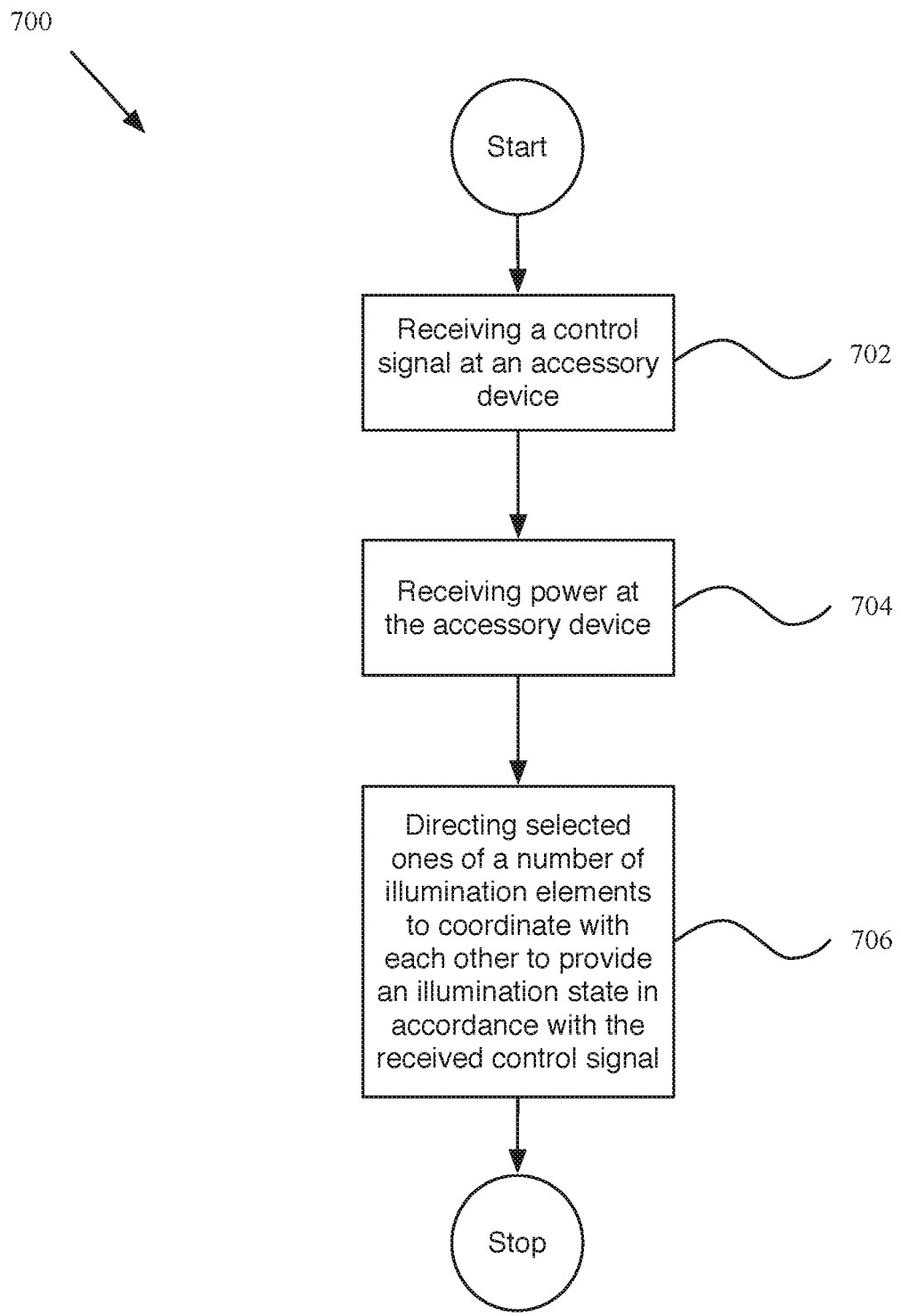
FIG. 7 shows a block diagram describing a process for alerting a user through an accessory device of an operating state of a host device.

FIG. 7 shows a block diagram describing a process 700 for alerting a user of changes in an operating state of a host device coupled to an accessory device. In step 702 a control signal is received from the host device. The control signal can be received from any of a number of different types of host devices including for example a tablet device. In one embodiment the control signal can be transmitted via a physical connection between the accessory device and the host device, while in another embodiment the control signal can be delivered wirelessly over a wireless protocol such as Bluetooth or Wi-Fi. At step 704 power is received by the accessory device. Power can be received through a physical connector electrically coupling the accessory device to the host device. In other embodiments power can be inductively transferred from the host device to the accessory device by way of inductive coils arranged in both the accessory device and the host device, where the inductive coils are aligned when the accessory device covers a display of the host device. At step 706 the received power and control signal are used to illuminate a select number of illumination elements of the accessory device. The elements are illuminated in accordance with the control signal which can direct coordination of any number of the illumination elements to produce an illumination state. The illumination state produced is linked directly to an operating state of the host device.

It should be noted that the term operating state is broadly defined and can include states such as low battery charge level, low/no connectivity, high priority message receipt (such as receipt of a message from a predefined list of individuals), application waiting on user input, or any number of other states a user should be aware of. In many embodiments illumination states can be user configurable. In one embodiment user configuration of illumination states can be performed on the host device through a graphical user interface disposed on the display of the host device. In some embodiments the accessory can have an associated application for customization of all illumination states, while in other embodiments user customization of illumination states can be an option available only when the accessory device is attached to the host device. For example, in a low power operating state all illumination states can be configured to operate at a reduced brightness to help conserve power. Customization of this operating state can include changing the definition of what percentage of a battery charge constitutes a low power state. A user can further customize an illumination state by defining exactly how much brightness is reduced in any given low power state. In some embodiments the cover illumination system can be configured to be completely disabled when the battery falls below a predefined threshold for power conservation purposes.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data, which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An accessory device for use with an electronic device having a display, the accessory device comprising:
    a flap portion having a size and shape to cover the display, the flap portion configured for communication with the electronic device;
    a hinge secured with the flap portion, the hinge allowing the flap portion to pivot relative to the electronic device; and
    discrete lighting elements embedded in the flap portion, wherein when the flap portion is in communication with the electronic device, the flap portion is capable of receiving a command that illuminates a predetermined number of the discrete lighting elements, and wherein light emitted from the predetermined number of discrete lighting elements is visible on an outer surface of the flap portion.

2. The accessory device of claim 1, wherein the discrete lighting elements comprise light emitting diodes, and wherein a predetermined number of light emitting diodes that provides the light and defines a notification.

3. The accessory device of claim 1, wherein the communication comprises a wireless communication.

4. The accessory device of claim 1, wherein the discrete lighting elements receive power via the communication with the electronic device.

5. The accessory device of claim 1, wherein the discrete lighting elements are substantially invisible until placed in an illumination state defined by illumination of the predetermined number of the discrete lighting elements.

6. The accessory device of claim 2, wherein the notification comprises an operating state of the electronic device.

7. The accessory device of claim 2, wherein the notification provides an indication of a message received by the electronic device.

8. The accessory device of claim 2, wherein the notification comprises at least one character of a word.

9. An accessory device for use with an electronic device having a touch sensor and display configured to present visual information, the accessory device comprising:
    a flap portion comprising:
        a first portion having a size and shape to cover the display, the first portion comprising a translucent material through which the visual information is allowed to pass, and
        a second portion different from the first portion, the second portion comprising an opaque material that defines
    a hinge connected to the first portion, the hinge allowing the second portion to pivot relative to the first portion.

10. The accessory device of claim 9, wherein the translucent material further allows an input to be received by the touch sensor.

11. The accessory device of claim 9, wherein the flap portion includes a rectilinear shape having a size in accordance with a front of the electronic device.

12. The accessory device of claim 9, wherein the flap portion is configured for wireless communication with the electronic device.

13. An accessory device for use with an electronic device having a touch sensor and display configured to present visual information, the accessory device comprising:
    a flap portion having a size and shape to cover the display, the flap portion having an opening;
    a hinge secured with the flap portion, the hinge allowing the flap portion to pivot over the electronic device and cover the display to define a closed configuration; and
    a transparent material positioned in the opening, the transparent material allowing an input to be received by the touch sensor, wherein in the closed configuration, the flap portion limits the visual information to a location of the display corresponding to the opening.

14. The accessory device of claim 13, wherein the flap portion comprises a first material, and wherein the transparent material comprises a second material different from the first material.

15. The accessory device of claim 13, wherein the opening includes a size smaller than that of the display.

16. The accessory device of claim 13, wherein the flap portion is configured for wireless communication with the electronic device.

17. The accessory device of claim 13, wherein the flap portion comprises:
    a first portion that includes the opening and the transparent material; and
    a second portion foldable with respect to the first portion, the second portion including the hinge.

18. The accessory device of claim 17, wherein only the first portion includes the transparent material.

19. The accessory device of claim 9, wherein the transparent material allows access to the visual information when the flap portion covers the display.

20. The accessory device of claim 9, wherein when the flap portion covers the display, the transparent material allows an interaction with the visual information in a location corresponding to the transparent material.

* * * * *